United States Patent Office 3,287,294
Patented Nov. 22, 1966

3,287,294
ALKYLOLATED ACRYLAMIDE INTERPOLYMERS COMPRISING VINYL STEARATE
Kazys Sekmakas and Frank Ragas, Chicago, Ill., assignors to De Soto Chemical Coatings, Inc., Chicago, Ill., a corporation of Delaware
No Drawing. Filed Dec. 11, 1961, Ser. No. 158,552
12 Claims. (Cl. 260—22)

The present invention relates to organic solvent solution coating compositions containing, as the essential film-forming resin component, heat-hardenable water-insoluble acrylamide interpolymers which bake to form hard and flexible films.

Etherified alkylolated acrylamide-containing interpolymers have previously been used in organic solvent solution coating compositions. Unfortunately, when the interpolymer is the sole film-forming component of the coating, it has not been possible to obtain a fully satisfactory combination of properties. Primarily, when the coatings were hard, they were brittle. On the other hand, when the coatings were adequately flexible, they were unduly soft. In an effort to provide a more desirable balance of physical properties, the interpolymers have been blended by the art with various other resinous materials. These blends are effective to some extent, but fully satisfactory systems have not been achieved, primarily due to the fact that full compatibility between the separate resinous components is difficult to achieve.

The present invention provides new solvent-soluble, heat-hardenable, water insoluble acrylamide interpolymers which possess improved flexibility and impact resistance in combination with the achievement of high levels of film hardness, surface gloss, solvent resistance and adhesion.

It will be appreciated that the achievement of harder and more solvent resistant films is inconsistent with the simultaneous achievement of more flexible and impact resistant films and these antagonistic properties are unexpectedly combined in the new compositions of the invention.

In accordance with the invention, vinyl stearate is copolymerized with acrylamide and at least one other ethylenically unsaturated monomer copolymerizable therewith to provide a non-gelled, solvent-soluble and heat-hardenable copolymer or interpolymer. As is conventional in the art of acrylamide interpolymers, the amido hydrogen atoms are replaced by the structure

wherein R is selected from the group consisting of hydrogen, furyl, and saturated lower aliphatic hydrocarbon radicals containing up to 10 carbon atoms, and $R_1$ is selected from the group consisting of hydrogen, and alkyl and alkoxy alkyl radicals containing up to 10 carbon atoms in the radical. Preferably, R is hydrogen and $R_1$ is an alkyl radical containing from 3–8 carbon atoms.

Vinyl stearate is essential to the invention, and the unique properties which it contributes to the interpolymers of the invention are not supplied by other monoethylenically unsaturated monomers, even by the most common vinyl ester, vinyl acetate. The essential vinyl stearate component is used in an amount of from 3–50% by weight, preferably from 5–25% by weight, based on the total weight of copolymerized components.

While it is preferred to employ acrylamide in proportions of from 5 to 45%, preferably from 5 to 30% by weight, with unsaturated monomers containing the $CH_2=C<$ group, the invention is not limited to acrylamide or to the presence of a terminal methylene group. Thus, other acrylamide monomers such as methacrylamide and itaconate diamide may be used. Indeed, amides of other unsaturated acids such as maleic acid diamide, fumaric acid diamide, sorbic acid amide and muconic acid diamide may less desirably be used.

The balance of the copolymer, at least 10% by weight, which is interpolymerized with the vinyl stearate and acrylamide components, are ethylenically unsaturated components which preferably are monomers containing the $CH_2=C<$ group. These monomers may be used alone or in combination. Styrene, vinyl toluene or methyl methacrylate alone or in admixture with one another are desirably present in an amount of at least 10% by weight, preferably at least 20% by weight, to provide desirable hardness to the interpolymer. Proportions of other vinyl monomers such as $C_2$–$C_{20}$ alkyl acrylate and methacrylate esters may also be present. However, the invention is not restricted to the selection of monomers containing the $CH_2=C<$ group or to the selection of preferred combinations of monomers. Thus, monomers which do not contain the $CH_2=C<$ group may be interpolymerized with acrylamide either alone or in the presence of monomers which do contain the $CH_2=C<$ group. Particular attention is directed to maleic acid or anhydride, maleic acid monoesters and diesters, butene-2 and fatty acids containing conjugated unsaturation such as dehydrated castor oil fatty acids which are useful in the production of interpolymers with acrylamide. Still other monomers which may be used are acrylic acid, methacrylic acid, 1,3-butadiene, vinyl ethers such as n-butyl vinyl ether, glycidyl methacrylate, etc. Also, minor proportions of ethylenically unsaturated polyesters may be present in the interpolymer as is more fully disclosed in the copending application of Sekmakas Serial No. 115,330, filed June 7, 1961, now U.S. Patent No. 3,163,-615, issued December 29, 1964, the disclosure of which is hereby incorporated by reference.

The interpolymers of the invention are desirably produced by a single stage solution copolymerization which is more fully described in the prior copending application of Sekmakas, Ansel and Drunga Serial No. 100,804, filed April 5, 1961, now U.S. Patent No. 3,163,623, issued December 29, 1964, the disclosure of which is hereby incorporated by reference. Thus, organic solvent, aldehyde, vinyl stearate, an acrylamide and at least one other monoethylenically unsaturated component are reacted with one another in the presence of heat and in the presence of a basic catalyst and a free-radical generating polymerization catalyst, and polymerization and alkylolation take place simultaneously. Preferably, the monomers are added to the organic solvent solution in which copolymerization is effected, slowly and at a uniform rate (desirably by continuous addition) to permit more precise control of the reaction and to provide a more uniform interpolymer product. Also, continuous monomer addition enables temperature control during the reaction despite the highly exothermic reaction which normally occurs. In the presence of alcohol, continuous removal of water, as by refluxing coupled with azeotropic distillation, etherification takes place at the same time and at least some of the methylol groups in the alkylolated product are etherified.

The alkaline catalyst is essential to the single stage reaction, for its absence leads to the production of an insoluble gelled structure which is not useful.

At least 0.1% of alkaline catalyst, based on the weight of monomers being copolymerized, is essential to avoid gelation. On the other hand, it is preferred to use not more than 1.0% of alkaline catalyst because the products so-produced have slow curing properties and are less desirable.

Any alkaline compound may be used, those having a nitrogen base being preferred. Amines, and especially tertiary amines are particularly preferred. Thus, inorganic alkaline compounds such as alkali metal hydroxides and alkaline earth metal hydroxides are broadly operable, but are not preferred because these introduce impurities into the resinous product. Ammonia is quite suitable as are quaternary ammonium compounds such as tetramethyl ammonium hydroxides. Amines such as ethyl amine and butyl amine may be used. However, tertiary amines illustrated by triethyl amine, tripropyl amine and tributyl amine are particularly preferred. The degree of etherification may be changed, and thereby controlled, by changing the amount of alkaline catalyst which is employed.

Any free-radical generating polymerization catalyst may be used, the selection of catalyst being determined by the desired temperature of the polymerization reaction. The important point is that the agent liberate free radicals under the conditions of polymerization so that the addition polymerization is facilitated.

Thus, copolymerization catalysts which generate free radicals starting at low temperatures, e.g., from 30–50° C. are usable, these being illustrated by acetyl benzoyl peroxide, peracetic acid, hydroxybutyl peroxide, isopropyl percarbonate, cyclohexanone peroxide, cyclohexyl peroxide, 2,4-dichlorobenzoyl peroxide, and cumene hydroperoxide.

Suitable catalysts which are active to begin generating free radicals at somewhat more elevated temperatures of about 60° C. are illustrated by t-butyl hydroperoxide, methyl amyl ketone peroxide, acetyl hydroperoxide, lauroyl peroxide, methyl cyclohexyl hydroperoxide, t-butyl permaleic acid, t-butyl perbenzoate, di-t-butyl diperphthalate, N,N'-azodiisobutyronitrile and benzoyl peroxide.

Preferably, free-radical generating catalysts which become active at still more elevated temperatures of about 100° C. are used in accordance with the invention, these being illustrated by t-butyl perphthalic acid, p-chlorobenzoyl peroxide, t-butyl peracetate, dibenzal diperoxide and di-t-butyl peroxide.

The aldehyde modifying agent is desirably used in an amount of from 0.2–5 equivalents of aldehyde, and preferably in an amount of from 1–4 equivalents of aldehyde for each amide group used in the formation of the acrylamide interpolymer. The preferred aldehyde is formaldehyde. Other monoaldehydes, including acetaldehyde, propionaldehyde, butyraldehyde, and furfural, or substances yielding an aldehyde, such as paraformaldehyde, hexamethylene tetramine or trioxymethylene can also be used.

Etherification of the aldehyde-modified amide interpolymer is preferred, but not essential. Lower alcohols containing up to 10 carbon atoms, especially butanol, are preferred for etherification and the etherification reaction may be carried out up to 100% of the alkylol radical present in the interpolymer although partial etherification is preferred. The degree of etherification is easily controlled in accordance with the invention by adjusting the proportion of alkaline catalyst, such control being a feature of the invention. When less than 100% etherification is effected, the product is a mixture in which the amido hydrogen atoms in some of the acrylamide interpolymer molecules are replaced by the structure —ROH, and the amido hydrogen atoms in other of the acrylamide interpolymer molecules are replaced by the structure —ROR$_1$, R representing a saturated aliphatic hydrocarbon radical introduced by the aldehyde modifying agent and R$_1$ is the residue of the etherifying alcohol.

The vinyl stearate-containing acrylamide interpolymers of the invention may be employed alone as the only film-forming resinous component of a coating composition, or they may be used in combination with other resinous film-forming components. In such combinations, the products of the invention are specifically and importantly different from prior acrylamide interpolymers because they exhibit improved compatibility with other resinous materials in organic solvent solution and in the film which is deposited therefrom. This improved compatibility is particularly evident in combination with aminoplast resins such as solvent-soluble, heat, hardening condensation products of polyamines such as urea and melamine with a stoichiometric excess of formaldehyde. Thus, compatibility in solution was formerly restricted for melamine resins to about 15% based on the total weight of resin in solution while the invention permits compatibility at significantly higher concentrations, e.g., from 20% up to about 70% by weight.

Thus, and as indicated in United States Patent No. 2,940,945, acrylamide interpolymers may be combined with alkyd resins, especially oil-modified alkyd resins. The vinyl stearate-containing acrylamide interpolymers of the invention are similarly combinable with alkyd resins, especially oil-modified alkyd resins to produce more desirable combinations of film hardness and film flexibility.

The vinyl stearate-containing acrylamide interpolymers of the invention may also be combined with a copolymer of methyl methacrylate and the ester reaction product of drying oil or drying oil fatty acid with a resinous polyhydric alcohol, the copolymer containing 4–45% by weight of the copolymerized monomer based on the weight of the copolymer, as is more fully disclosed in the copending application of Chloupek and Gaske Serial No. 89,667, filed February 16, 1961, now abandoned, the disclosure of which is hereby incorporated by reference.

Excellent combinations of film hardness and film flexibility are also achieved by combining the vinyl stearate-containing acrylamide interpolymers of the invention with resinous copolymers which include copolymerized allyl alcohol. Preferably, these resinous polyols are copolymers of from 1–40% by weight of an allyl alcohol such allyl alcohol or methallyl alcohol or mixtures thereof with at least 30% by weight, preferably at least 50% by weight, of styrene, ring-substituted styrene in which the substituents may be halogen and/or lower alkyl radicals containing up to 4 carbon atoms and methyl methacrylate. Suitable ring-substituted styrenes are illustrated by ortho, meta and paramethyl, ethyl and butyl styrenes, ortho-para or ortho-meta dimethyl or diethyl styrenes, mono-, di-, and trichlorostyrenes, and alkyl chlorostyrenes such as ortho methyl para chlorostyrene, vinyl toluene being preferred. While the allyl alcohol containing resinous copolymer component can be liquid or solid, the copolymer component which is solid at room temperature is preferred. The preferred copolymer components are normally solid resins which include sufficient hydroxyl groups to provide an allyl alcohol content of from 10.30% by weight.

When the allyl alcohol-containing copolymer includes at least 10% by weight of allyl alcohol, the copolymer includes substantial hydroxyl functionality and it is sufficient, for purposes of the invention, to employ mixtures of vinyl stearate-containing acrylamide interpolymer and allyl alcohol-containing copolymer containing from 1–15% by weight of the latter in the mixture. From the standpoint of preferred proportions and using a copolymer having an allyl alcohol content of 20%, it is preferred to employ from 3–10% by weight of allyl alcohol-containing copolymer based on the total weight of the mixture thereof with the vinyl stearate-containing acrylamide interpolymer. When small proportions of copolymer containing from 10–30% of allyl alcohol are used, it is preferred that the balance of the copolymer consist essentially of styrene, ring-substituted styrene and methyl methacrylate, these monomers being used either alone or in admixture with one another.

It is pointed out that the allyl alcohol-containing copolymer may contain only a small proportion of allyl alcohol, e.g., 1–5% by weight. In these instances, larger proportions of the allyl alcohol-containing copolymer may be desirably present in the vinyl stearate-containing acrylamide interpolymer blends. Thus, the blends may broadly include up to 75% by weight of the total mixture of the allyl alcohol-containing component, although it is preferred not to employ more than 30% by weight of allyl alcohol-containing copolymer in the mixture.

The allyl alcohol-containing copolymer may also include other monoethylenically unsaturated monomers. The presence of small amounts of some monomers, such as acrylic acid, is helpful in the production of the copolymer. The presence of other monomers may also be desirable for the purpose of balancing the physical properties of the copolymer. Thus, up to 50% by weight of the copolymer may be constituted by a monoethylenically unsaturated ester containing from 2–20 carbon atoms in a terminal aliphatic hydrocarbon chain, these being illustrated by ethyl acrylate, n-butyl acrylate, 2-ethyl-hexyl acrylate, butyl methacrylate, vinyl acetate and vinyl stearate.

Combinations with aminoplast resins have previously been mentioned, it being stressed that the excellent compatibility achieved permits large proportions of aminoplast resin, in excess of 20%, based on total resin solids, to be used leading to very hard films which possess, despite this film hardness, surprisingly good flexibility.

The vinyl stearate-containing acrylamide interpolymers of the invention may also be combined with epoxy resins which are polyglycidyl ethers of polyhydric phenols, the oxirane reactivity of the epoxy resin helping to cure the interpolymer.

The advantages of the invention will be particularly apparent from the examples which follow. Examples I and II illustrate the preparation of a typical vinyl stearate-containing acrylamide interpolymer and compare this interpolymer with essentially the same interpolymer produced using vinyl acetate in place of vinyl stearate.

*Example I*

|  | Example I-A | Example I-B |
|---|---|---|
| Interpolymer Composition, Percent: | | |
| Vinyl acetate | 10 | |
| Vinyl stearate | | 10 |
| Acrylamide | 15 | 15 |
| Methyl methacrylate | 40 | 40 |
| Methyl acrylate | 5 | 5 |
| Ethyl acrylate | 30 | 30 |
|  | 100 | 100 |
| Charge Composition, grams: | | |
| Xylol | 333 | 333 |
| n-Butanol | 133 | 133 |
| n-Butyl formcel | 75 | 75 |
| Acrylamide | 150 | 150 |
| Butyl Cellosolve | 320 | 320 |
| n-Butanol | 200 | 200 |
| n-Butyl formcel | 200 | 200 |
| Methyl methacrylate | 400 | 400 |
| Methyl acrylate | 50 | 50 |
| Ethyl acrylate | 300 | 300 |
| Vinyl acetate | 100 | |
| Vinyl stearate | | 100 |
| Di-tert-butyl peroxide | 5 | 5 |
| Azobisbutyronitrile | 5 | 5 |
| Tertiary dodecyl mercaptan | 14 | 14 |
| Triethyl amine | 3 | 3 |

*Procedure for polymerization.*—Charge 333 grams of xylol, 133 grams of butanol and 75 grams of n-butyl formcel (40% formaldehyde in butanol) into a reactor equipped with an agitator, condenser, Dean-Stark trap, thermometer and nitrogen inlet. The mixture is heated to reflux temperature of 235–240° F.

Dissolve 150 grams of acrylamide in 320 grams of butyl Cellosolve and 200 grams of butanol and premix with 400 grams of methyl meachacrylate, 50 grams of methyl acrylate, 300 grams of ethyl acrylate and 100 grams of vinyl acetate (Example I-A) or 100 grams of vinyl stearate (Example I-B).

To this solution of monomers are added the catalysts: 5 grams of di-tert-butyl peroxide, 5 grams of azobisbutyronitrile and 3 grams of triethy amine. To minimize molecular weight, 14 grams of tertiary dodecyl mercaptan are also added to the blend.

The above described monomer solution, including catalysts and mercaptan is added to the reactor over 2½ hour period of time, maintaining the temperature at 245–255° F. While removing water by azeotropic distillation and collection in the Dean-Stark trap. The contents of the reactor are maintained at reflux temperature (255° F.) for 10 hours. 22 grams of water are collected in the Dean-Stark trap.

The resulting interpolymers had the following physical characteristics:

|  | Example I-A | Example I-B |
|---|---|---|
| Solids (percent) | 48.3 | 48.5 |
| Viscosity (Gardner) | $Z_1$–$Z_2$ | X |
| Color (Gardner) | 2–3 | 2–3 |

*Example II*

The resins of Examples I-A and I-B are utilized in enamel formulations containing 28% titanium dioxide and 32% non-volatile resin solids. The mixture is ground in a pebble mill to obtain a 7½ N.S. grind gauge reading. The characteristics of the enamel are checked without catalyst and with 0.5% phosphoric acid, based on the total resin solids. The enamel is drawn down on iron phosphate coated steel and baked for 20 minutes at 325° F. The following results are obtained:

|  | Resin of Example I-A (Vinyl Acetate) | Resin of Example I-B (Vinyl Stearate) |
|---|---|---|
| Gloss and appearance | Excellent | Excellent. |
| Pencil hardness | 2H–3H | 2H–3H. |
| Flexibility (conical mandrel) | Fail ⅝″ bend | Pass ⅛″ bend. |
| Impact (forward) | Fail 5 in lbs | Pass 20 in lbs. |
| Toluol resistance | Good | Good. |
| Adhesion | Very Good | Very Good. |
| Catalyst | None | None. |

|  | Resin of Example I-A (Vinyl Acetate) | Resin of Example I-B (Vinyl Stearate) |
|---|---|---|
| Gloss and appearance | Excellent | Excellent. |
| Pencil hardness | 3H | 3H. |
| Flexibility (conical mandrel) | Fail ⅛″ bend | Pass ⅛″ bend. |
| Impact (forward) | Fail 5 in lbs | Pass 20 in lbs. |
| Toluol resistance | Very Good | Very Good. |
| Adhesion | do | do. |
| Catalyst | 0.5% Phosphoric Acid based on resin solids. | 0.5% Phosphoric Acid based on resin solids. |

As can be seen from this comparison, the inclusion of vinyl stearate into acrylamide polymers increases flexibility and impact resistance without decreasing film hardness. Also, there is no degradation of other desirable properties such as solvent resistance, gloss and adhesion.

Further examples of vinyl stearate-containing acrylamide interpolymer and their value in numerous combinations with other resins are shown in the examples which follow:

*Example III*

| Interpolymer composition: | Percent |
|---|---|
| Acrylamide | 13 |
| Vinyl stearate | 10 |
| Styrene | 45 |
| Methyl methacrylate | 20 |
| 2-ethylhexyl acrylate | 100 |

| Charge composition: | Grams |
|---|---|
| Xylene [1] | 333 |
| n-Butanol [1] | 133 |

[1] Charge into reactor heat to 265° F.

Charge composition:—Continued | Grams
--- | ---
Acrylamide [2] | 130
Butyl Cellosolve [2] | 320
n-butanol [2] | 200
Vinyl stearate [3] | 100
Styrene [3] | 450
Methyl methacrylate [3] | 200
2-ethylhexyl acrylate [3] | 120
Di-tert-butyl peroxide [3] | 5
Benzoyl peroxide [3] | 6
Tertiary dodecyl mercaptan [3] | 12
n-Butyl formcel [4] | 275
Maleic anhydride [4] | 3.3

[2] Dissolve acrylamide.
[3] Mix with acrylamide solution.
[4] Remove 51 grams of water.

*Procedure for polymerization.*—The 333 grams of xylene and 133 grams of n-butanol are heated to 265° F. using a light nitrogen sparge. The solution of monomers, peroxy catalysts and mercaptan is then charged into the reactor over a 2½ hour period of time, maintaining the temperature of the reactor at reflux temperature (260–270° F.). When the reactor is fully charged, the mixture is heated for 6 hours at 270° F., to effect copolymerization.

The copolymerization product is then cooled to 225–230° F., and n-butyl formcel is added to the mixture which is further refluxed for one hour. 50 grams of butanol are distilled off and maleic anhydride dissolved in butanol is added to the mixture. The Dean-Stark trap is filled with butanol and 51 grams of water are distilled off by azeotropic distillation.

The resulting interpolymer had the following physical characteristics:

Solids (percent) | 49.2
--- | ---
Viscosity (Gardner) | V
Color (Gardner) | 1–2

The above described resin was evaluated in a flat siding enamel having the following composition:

| | Percent |
--- | ---
Pigment | 31.7
  TiO₂ | 60.4
  Diatomaceous earth | 22.0
  Talc | 17.6
Vehicle | 68.3
  Polymer Example III | 95.5
  Resinous polyol (Note 1) | 4.5
Total non-volatile solids | 58.6
Vehicle non-volatile solids | 26.9

The following results were obtained when the above enamel was baken on aluminum for one minute at 500° F.:

Flexibility | Very good.
--- | ---
Solvent resistance | Excellent.
Blocking | Do.
Dry heat resistance | Very good.
Adhesion | Do.
Pencil hardness | 2H.

NOTE 1: A copolymer of styrene and allyl alcohol having an average molecular weight of 1150 and an average equivalent weight, based on hydroxyl functionality, of 222.

*Example IV*

Interpolymer composition: | Percent
--- | ---
Acrylamide | 15
Styrene | 40
Methyl acrylate | 5
Ethyl acrylate | 35
Vinyl stearate | 5
 | 100

Charge composition: | Grams
--- | ---
Acrylamide | 150
Styrene | 400
Methyl acrylate | 50
Ethyl acrylate | 350
Vinyl stearate | 50
Xylol | 333
n-Butanol | 333
Butyl Cellosolve | 320
n-Butyl formcel | 275
Triethyl amine | 32
Di-tert-butyl peroxide | 5
Azobisbutyronitrile | 5
Tert-dodecyl mercaptan | 14

The above materials are copolymerized in the manner set forth in Example I to provide an interpolymer having the following physical characteristics:

Solids (percent) | 47.5
--- | ---
Viscosity (Gardner) | W–X
Color (Gardner) | 1–2

*Example V*

Interpolymer composition: | Percent
--- | ---
Vinyl stearate | 10
Acrylamide | 15
Butyl acrylate | 15
Ethyl acrylate | 15
Methyl acrylate | 5
Styrene | 40
 | 100

Charge composition: | Grams
--- | ---
Acrylamide | 150
Vinyl stearate | 100
Styrene | 400
Methyl acrylate | 50
Ethyl acrylate | 350
Butyl acrylate | 150
Xylol | 333
n-Butanol | 333
n-Butyl formcel | 275
Di-tert-butyl peroxide | 5
Azobisbutyronitrile | 5
Triethyl amine | 4.2
Tert-dodecyl mercaptan | 14

The above materials are copolymerized in the manner set forth in Example I to provide an interpolymer having the following physical characteristics:

Solids (percent) | 47.1
--- | ---
Viscosity (Gardner) | U–V
Color (Gardner) | 1–2

*Example VI*

Interpolymer composition: | Percent
--- | ---
Vinyl stearate | 20
Acrylamide | 15
Styrene | 40
Methyl acrylate | 5
Ethyl acrylate | 20
 | 100

Charge composition: | Grams
--- | ---
Acrylamide | 150
Styrene | 400
Vinyl stearate | 200
Methyl acrylate | 50
Ethyl acrylate | 200
Xylol | 333
n-Butanol | 333

Charge composition:—Continued Grams
  Butyl Cellosolve _____ 320
  n-Butyl formcel _____ 275
  Di-tert-butyl peroxide _____ 5
  Triethyl amine _____ 4.2
  Azobisbutyronitrile _____ 5
  Tert-dodecyl mercaptan _____ 16

The above materials are copolymerized in the manner set forth in Example I to provide an interpolymer having the following final characteristics:

Solids (percent) _____ 46
Viscosity (Gardner) _____ Q–R
Color (Gardner) _____ 1–2

Example VII

An enamel is prepared using 28% titanium dioxide, and 32% non-volatile resins, 60% of the resin being supplied by the interpolymer solution of Example IV and 40% of the resin being benzoguanamine resin (see Note 2) supplied as a solution in xylol/butanol (1/1) at 60% solids. A 0.003″ coating of the enamel is made on bare steel panels and baked for 20 minutes at 350° F. The following results are obtained:

Gloss and appearance_____ Excellent.
Pencil hardness _____ 3H–4H.
Mar resistance _____ Very good.
Flexibility _____ Do.
Toluol resistance _____ Excellent.

NOTE 2: The benzoguanamine-formaldehyde resin is a condensation product of 4 mols of formaldehyde with 1 mol of benzoguanamine in the presence of excess butanol and an acid catalyst to provide a heat-hardenable resin etherified with butanol to provide solubility. The resin is utilized as a 60% resin solids solution of benzoguanamine-formaldehyde resin in a 50/50 weight ratio mixture of butanol/xylol.

A series of combination enamels are prepared to include 28% titanium dioxide and 32% non-volatile resins, 75% of the resin being supplied by the interpolymer solution of Example IV and 25% of the resin being supplied by a 50% resin solids solution in a 1/1 weight ratio mixture of xylol/butanol. These combination enamels are applied to base steel panels as a 0.003″ set film and baked for 20 minutes at 350° F. to provide the results tabulated below:

V and 55% of the resin being supplied by the benzoguanamine-formaldehyde solution used in Example VII. A 0.003″ wet film of enamel coating is applied to bare steel panels and baked for 20 minutes at 350° F. The following results are obtained:

Gloss and appearance_____ Excellent.
Pencil hardness _____ 4H–5H.
Mar resistance _____ Very good.
Toluol resistance _____ Excellent.

Example XIII

An enamel is prepared using 28% titanium dioxide and 32% non-volatile resins solids of which 60% is the interpolymer of Example V and 40% of urea-formaldehyde resin (Note 7). A 0.003″ coating of enamel is made on bare steel panels and baked for 20 minutes at 350° F. The following results are obtained:

Gloss and appearance_____ Excellent.
Pencil hardness _____ 2H–3H.
Mar resistance _____ Very good.
Toluol resistance _____ Excellent.
Flexibility _____ Do.

NOTE 7: The urea-formaldehyde resin utilized is a solution of 60% resin solids of the heat-hardenable reaction product of urea with formaldehyde in a solvent consisting of butanol/xylol (weight ratio 20/30), having a viscosity of L–Q (Gardner-Holdt at 25° C.), and an acid number of 3–8 (computed on resin solids). One mol of urea is reacted with 2 mols of formaldehyde under alkaline conditions to form a resinous condensation product which is then etherified with one mol of butanol in the presence of a trace of phosphoric acid.

The invention is defined in the claims which follow:

We claim:

1. An organic solvent-soluble, heat-hardenable resinous interpolymer comprising:
   (A) an amide of an ethylenically unsaturated carboxylic acid;
   (B) vinyl stearate; and
   (C) at least one other ethylenically unsaturated compound copolymerizable with said amide and said vinyl stearate; said interpolymer having amido hydrogen atoms replaced by the structure

|  | Modifying Resins | | | |
|---|---|---|---|---|
|  | Example VIII, Castor Oil Baking Alkyd [3] | Example IX, Acrylic Copolymer [4] | Example X, Epoxy Resin [5] | Example XI, Melamine Resin [6] |
| Vehicle solids of modifying resin | 25% | 25% | 25% | 25%. |
| Vehicle solids of Interpolymer Example IV | 75% | 75% | 75% | 75%. |
| Gloss and appearance | Good | Good | Very Good | Good. |
| Pencil hardness | 2H | 2H–3H | H–2H | 3H. |
| Flexibility | Excellent | Excellent | Good | Very Good. |
| Toluol resistance | do | Good | do | Excellent. |

Note 3: The castor oil baking alkyd is the polyesterification reaction product of 33.8% dehydrated castor oil, 39% phthalic anhydride, 25.5% glycerine and 1.7% benzoic acid prepared by heating the castor oil, 11 parts of glycerine and 0.03 parts of lead oxide to 450° F., until the product is soluble in an equal volume of methyl alcohol, cooling the resulting product to 380° F., and adding to the cooled product phthalic anhydride, benzoic acid and 14.5 parts of glycerine, and heating to 420° F. until the acid value is reduced to 6.

Note 4: The acrylic copolymer consists of 42% dehydrated castor oil, 10% glycerine, 18% phthalic anhydride, 27% methyl methacrylate and 3% styrene and is prepared by charging the castor oil and the glycerine and heating to 400° F., adding 0.17% of 24% lead naphthenate and heating to 450° F. which is maintained until alcoholysis takes place (1:1 in methyl alcohol). After cooling the reaction product to 400° F., phthalic anhydride is added and the temperature is increased to 430° F. where it is held until a viscosity of D (Gardner scale measured at 60% solids in xylol) is obtained. The product is then cut to 80% solids with xylol and cooled to 270° F. and a mix of methylmethacrylate, styrene and di-tert-butyl peroxide catalyst is added slowly over a three hour period. When the addition is complete the temperature is increased to 280° F. for four hours and the copolymer product is cut to 60% resin solids with xylol.

Note 5: The epoxy resin is a substantially diglycidyl ether of 2,2′-bis(p-hydroxyphenylpropane) having a molecular weight of about 1000, an epoxide equivalent weight of about 500 (grams per epoxide equivalent weight), and a melting point of from 65–75° C.

Note 6: A heat-hardenable solvent-soluble melamine-formaldehyde condensate etherified with butanol to provide solvent solubility is employed in the form of a 55% by weight resin solids solution containing 25% butanol and 20% xylol. The melamine-formaldehyde resin is provided by heat reacting 5.5 mols of formaldehyde with 1 mol of melamine in the presence of excess butanol and a small amount of acid catalyst.

Example XII

An enamel is prepared using 28% titanium dioxide and 32%% non-volatile resin solids, 45% of the resin being supplied by the interpolymer solution of Example in which R is selected from the group consisting of hydrogen, furyl, and saturated lower aliphatic hydrocarbon radicals containing up to 10 carbon atoms and $R_1$ is selected from the group consisting of hydrogen, and alkyl and alkoxy alkyl radicals containing up to 10 carbon atoms in the radical.

2. An interpolymer of claim 1 in which said amide is an acrylamide and said component (C) is a monomer containing a single $CH_2=C<$ group.

3. An interpolymer of claim 1 in which said amido hydrogen atoms are replaced by the structure $$-CH_2-OH,$$

said structure being at least partially etherified with n-butanol.

4. An interpolymer of claim 1 which contains from 4–45% by weight of acrylamide, from 3–50% by weight of vinyl stearate, and at least 10% by weight of an ethylenically unsaturated monomer selected from the group consisting of styrene, vinyl toluene and methyl methacrylate, said percentages being based on the weight of the interpolymer.

5. An interpolymer of claim 1 which contains from 5–30% by weight of acrylamide and from 5–25% by weight fo vinyl stearate, based on the weight of the interpolymer.

6. An organic solvent solution coating composition comprising an organic solvent having dissolved therein, as the essential film-forming resin component, heat-hardenable resinous interpolymer comprising:
(A) from 5–45% by weight of an acrylamide;
(B) from 3–50% by weight of vinyl stearate; and
(C) at least 10% by weight of at least one other ethylenically unsaturated compound copolymerizable with said acrylamide and said vinyl stearate; said interpolymer being methylolated with formaldehyde and at least partially etherified with n-butanol.

7. An organic solvent solution coating composition comprising an organic solvent having dissolved therein:
(1) a heat hardenable resinous interpolymer comprising:
(A) an amide of an ethylenically unsaturated carboxylic acid;
(B) vinyl stearate; and
(C) at least one other ethylenically unsaturated compound copolymerizable with said amide and said vinyl stearate; said interpolymer having amido hydrogen atoms replaced by the structure

in which R is selected from the group consisting of hydrogen, furyl, and saturated lower aliphatic hydrocarbon radicals containing up to 10 carbon atoms and $R_1$ is selected from the group consisting of hydrogen, and alkyl and alkoxy alkyl radicals containing up to 10 carbon atoms in the radical; and
(2) an alkyd resin.

8. An organic solvent solution coating composition comprising an organic solvent having dissolved therein:
(1) a heat-hardenable resinous interpolymer comprising:
(A) an amide of an ethylenically unsaturated carboxylic acid;
(B) vinyl stearate; and
(C) at least one other ethylenically unsaturated compound copolymerizable with said amide and said vinyl stearate; said interpolymer having amido hydrogen atoms replaced by the structure

in which R is selected from the group consisting of hydrogen, furyl, and saturated lower aliphatic hydrocarbon radicals containing up to 10 carbon atoms and $R_1$ is selected from the group consisting of hydrogen, and alkyl and alkoxy alkyl radicals containing up to 10 carbon atoms in the radical; and
(2) a copolymer of copolymerizable ethylenically unsaturated monomer comprising a major proportion of methyl methacrylate and the ester reaction product of resinous polyhydric alcohol and ethylenically unsaturated compound selected from the group consisting of drying oils and drying oil fatty acids, said copolymer containing from 4–45% by weight of copolymerized monomer.

9. An organic solvent solution coating composition comprising an organic solvent having dissolved therein:
(1) a heat-hardenable resinous interpolymer comprising:
(A) an amide of an ethylenically unsaturated carboxylic acid;
(B) vinyl stearate; and
(C) at least one other ethylenically unsaturated compound copolymerizable with said amide and said vinyl stearate; said interpolymer having amido hydrogen atoms replaced by the structure

in which R is selected from the group consisting of hydrogen, furyl, and saturated lower aliphatic hydrocarbon radicals containing up to 10 carbon atoms and $R_1$ is selected from the group consisting of hydrogen, and alkyl and alkoxy alkyl radicals containing up to 10 carbon atoms in the radical; and
(2) a heat-hardenable aminoplast resin in which the amino group is reacted with an excess of aldehyde and etherified with an alcohol containing 3–8 carbon atoms.

10. A coating composition of claim 9 in which said aminoplast resin is present in an amount of at least 20% by weight, based on the total weight of said interpolymer and said aminoplast resin.

11. An organic solvent solution coating composition comprising an organic solvent having dissolved therein:
(1) a heat-hardenable resinous interpolymer comprising:
(A) an amide of an ethylenically unsaturated carboxylic acid;
(B) vinyl stearate; and
(C) at least one other ethylenically unsaturated compound copolymerizable with said amide and said vinyl stearate; said interpolymer having amido hydrogen atoms replaced by the structure

in which R is selected from the group consisting of hydrogen, furyl, and saturated lower aliphatic hydrocarbon radicals containing up to 10 carbon atoms and $R_1$ is selected from the group consisting of hydrogen, and alkyl and alkoxy alkyl radicals containing up to 10 carbon atoms in the radical; and
(2) a polygylcidyl ether of a polyhydric phenol.

12. An organic solvent solution coating composition comprising an organic solvent having dissolved therein:
(1) a heat-hardenable resinous interpolymer comprising:
(A) an amide of an ethylenically unsaturated carboxylic acid;
(B) vinyl stearate; and
(C) at least one other ethylenically unsaturated compound copolymerizable with said amide and said vinyl stearate; said interpolymer having amido hydrogen atoms replaced by the structure $$-\overset{R}{\underset{|}{C}}HOR_1$$

in which R is selected from the group consisting of hydrogen, furyl, and saturated lower aliphatic hydrocarbon radicals containing up to 10 carbon atoms and $R_1$ is selected from the group consisting of hydrogen, and alkyl and alkoxy alkyl radicals containing up to 10 carbon atoms in the radical; and (2) a copolymer of from 1–40% by weight of an allyl alcohol with polymerizable monoethylenically unsaturated monomer, said copolymer including at least 30% by weight of copolymerized monomer selected from the group consisting of styrene, $C_1$–$C_4$ alkyl- and halogen ring-substituted styrene.

References Cited by the Examiner

UNITED STATES PATENTS

| 2,870,117 | 1/1959 | Vogel et al. | 260—72 |
| 2,940,945 | 6/1960 | Christenson et al. | 260—22 |
| 3,037,963 | 6/1962 | Christenson | 260—45.3 |
| 3,163,623 | 12/1964 | Sekmakas et al. | 260—22 |

FOREIGN PATENTS

| 395,478 | 7/1933 | Great Britain. |
| 827,718 | 2/1960 | Great Britain. |

LEON J. BERCOVITZ, *Primary Examiner.*

ALFONSO D. SULLIVAN, *Examiner.*

R. W. GRIFFIN, *Assistant Examiner.*